(12) United States Patent
Larigani

(10) Patent No.: US 9,261,625 B2
(45) Date of Patent: Feb. 16, 2016

(54) ULTRA HIGH RESOLUTION GRAVITY GRADIOMETERY TECHNIQUE

(71) Applicant: California Institute of Technology, Pasadena, CA (US)

(72) Inventor: Shervin Taghavi Larigani, Woodland Hills, CA (US)

(73) Assignee: California Institute of Technology, Pasadena, CA (US)

(*) Notice: Subject to any disclaimer, the term of this patent is extended or adjusted under 35 U.S.C. 154(b) by 463 days.

(21) Appl. No.: 13/725,849

(22) Filed: Dec. 21, 2012

(65) Prior Publication Data

US 2014/0190255 A1 Jul. 10, 2014

Related U.S. Application Data

(60) Provisional application No. 61/579,573, filed on Dec. 22, 2011, provisional application No. 61/619,290, filed on Apr. 2, 2012, provisional application No. 61/665,793, filed on Jun. 28, 2012.

(51) Int. Cl.
*G01B 11/14* (2006.01)
*G01V 7/04* (2006.01)
*G01S 11/12* (2006.01)

(52) U.S. Cl.
CPC .. *G01V 7/04* (2013.01); *G01S 11/12* (2013.01)

(58) Field of Classification Search
CPC ......... G01S 17/46; G01S 5/163; G01B 11/26; G01B 11/00; G01B 7/003; G01B 9/02
USPC ........ 356/4.01–4.1, 139.03, 139.05, 622, 614
See application file for complete search history.

(56) References Cited

U.S. PATENT DOCUMENTS

| | | | | |
|---|---|---|---|---|
| 5,367,373 | A | * 11/1994 | Busch-Vishniac et al. | 356/139.03 |
| 8,625,108 | B2 | * 1/2014 | Bresciani et al. | 356/614 |
| 8,789,415 | B2 | * 7/2014 | Van Kann | 73/382 G |
| 2012/0261513 | A1 | * 10/2012 | Bresciani et al. | 244/158.4 |

OTHER PUBLICATIONS

NASA, Gravity Recovery and Interior Laboratory (GRAIL) Launch, 2011.*
Matsuya et al. 'Measuring Relative-Story Displacement and Local Inclination Angle Using Multiple Position-Sensitive Detectors', 2010.*

(Continued)

*Primary Examiner* — Luke Ratcliffe
*Assistant Examiner* — Assres H Woldemaryam
(74) *Attorney, Agent, or Firm* — Gates & Cooper LLP

(57) ABSTRACT

A method and system provide the ability to measure relative displacement and rotation. A first light is continuously shined from a first light source that is fixed on a first entity to a first two-dimensional (2D) plate fixed on a second entity. The first direction of propagation of the first light does not change relative to the first entity. A second light is shined from a second light source that is fixed on the first entity to a second 2D plate fixed on the second entity. A second direction of propagation of the second light does not change relative to the first entity and is different from the first direction of propagation. The displacement of the lights on plates is directly monitored to determine a 3D displacement vector that represents a relative displacement between the first entity and the second entity. Thus, a three dimensional gravity gradient tensor is constructed.

18 Claims, 9 Drawing Sheets

(56) References Cited

OTHER PUBLICATIONS

Antreasian, P. G., et. al., "Navigation of the Twin GRAIL Spacecraft into Science Formation at the Moon", 23rd International Symposium on Space Flight Dynamics, Pasadena, CA, Oct. 29-Nov. 2, 2012, pp. 1-30.

Arnon, S., et al., "Performance limitations of free-space optical communication satellite networks due to vibrations: direct detection digital mode", Optical Engineering, vol. 36(11), pp. 3148-3157, Nov. 1997.

Bender, P., et al., "LISA: Laser Interferometer Space Antenna for the detection and observation of gravitational waves, An international project in the field of Fundamental Physics in Space", Pre-Phase A Report, Second Edition, Jul. 1998, pp. 1-190. http://lisa.gsfc.nasa.gov/Documentation/ppa2.08.pdf.

Cornwall, J., et al., "Characterization of Underground Facilities", The MITRE Corporation, JASON Program Office, pp. 1-67, 1999.

"Focused Beam Diameter with Focusing Lens", Sintec Optronics Pte Ltd, Apr. 8, 2005, 1 page. www.sintecoptronics.com/ref/FocusedBeamDiameter.pdf.

"Gravity Gradiometry", 2 pages, Copyright 2013, 2 pages. http://www.gradiometry.com/gradiometry.

Kim, J., "Simulation Study of a Low-Low Satellite-to-Satellite Tracking Mission", Ph.D. Thesis, University of Texas at Austin, May 2000, pp. 1-275.

Max, Claire, "Wavefront Sensing", Lecture 7, Astro 289C, UCSC, Oct. 13, 2011, pp. 1-45.

Reigber, C., et.al, "GRACE: Gravity Recovery and Climate Experiment", Key GRACE Facts, The Earth Observing System Project Science Office, NASA, Dec. 2003, pp. 1-20. http://eospso.gsfc.nasa.gov/eos_homepage/mission_profiles/docs/GRACE.pdf.

Thomas, Sandrine, "Optimized Centroid Computing in a Shack-Hartmann Sensor", Advancements in Adaptive Optics, Proceedings of the SPIE, vol. 5490, 2004, pp. 1238-1246.

\* cited by examiner

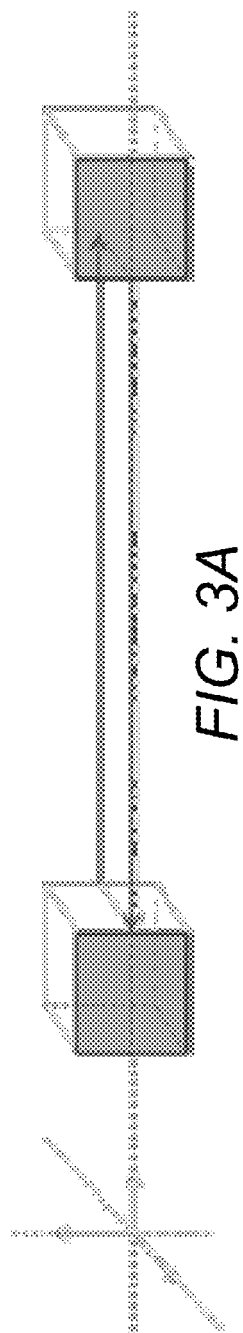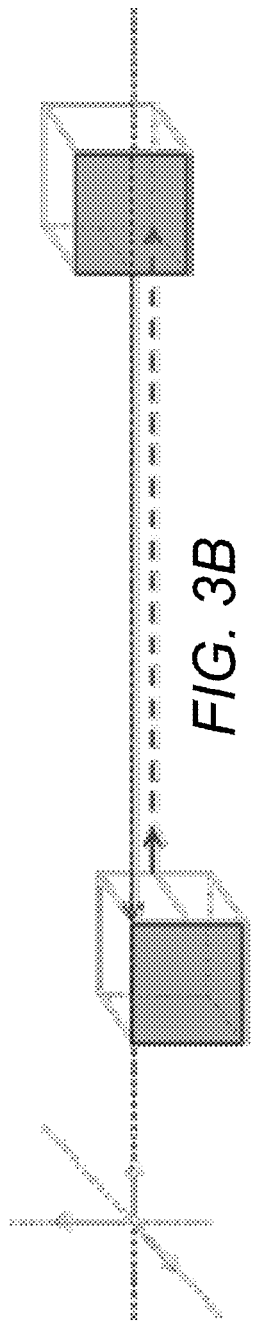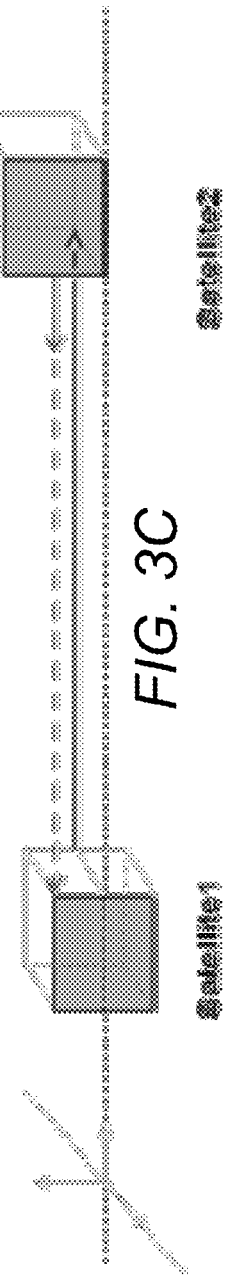

ULTRA HIGH RESOLUTION GRAVITY GRADIOMETERY TECHNIQUE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/579,573, filed on Dec. 22, 2011, by Shervin Taghavi, entitled "Novel remote sensing technique based on measuring the relative displacement between two satellites,";

Provisional Application Ser. No. 61/619,290, filed on Apr. 2, 2012, by Shervin Taghavi, Massimo Tinto, Jakob J. Van-Zyl, Michael R. Hoffmann, and Christopher Boxe, entitled "Novel remote sensing technique based on measuring the relative displacement between two satellites,"; and Provisional Application Ser. No. 61/665,793, filed on Jun. 28, 2012, by Shervin Taghavi, Jakob J. VanZyl, Michael R. Hoffmann, and Christopher Boxe, entitled "Novel Remote Sensing Technique Based on Measuring the Relative Displacement between Two Satellites,".

This application is related to the following patent application, which application is incorporated by reference herein:

Provisional Application Ser. No. 61/558,297, filed on Nov. 10, 2011, by Shervin Taghavi, entitled "Novel technique for measuring with great resolution the relative displacement and rotation between satellites, airplanes, etc. . . . ,".

BACKGROUND OF THE INVENTION

1. Field of the Invention

The present invention relates generally to measuring the relative displacement between two entities (such as satellites, airplanes, etc.) or between any moving or static entities, wherein such displacement is measured in three (3) dimensions.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The measurement and study of variations in the acceleration caused by gravity is called gravity gradiometry. This technique has been used to examine subsurface geology to aid hydrocarbon (oil), water, mineral exploration, tunnel and bunker detection. The most frequently used and intuitive component is the vertical gravity gradient, $G_{yy}$, which represents the rate of change of vertical gravity ($g_y$) with height (y). As an example, a person walking past at a distance of two (2) meters would provide a gravity gradient signal approximately equivalent to $10^{-9}$ m/s$^2$ [3].

Recently, the Gravity Recovery and Climate Experiment (GRACE) (which was a joint mission of NASA and the German Aerospace Center) and the Gravity Recovery and Interior Laboratory (GRAIL) mission (which is part of NASA's Discovery Program) have used a gravity gradiometry technique for mapping the gravitational field of the Earth and the Moon, respectively. Both missions are very similar to each other; they are composed of two twin satellites following each other in the same orbit, [1,2]. As the first satellite passes over a region of stronger gravity called a gravity anomaly, it is pulled ahead of the trailing satellite. This increases the separation distance between the two satellites. As the first satellite moves away from the anomaly, it decelerates; meanwhile the second satellite approaches the anomaly, therefore it accelerates. The combination of these two phenomena induces a decrease in the relative distance between the two satellites. By constantly monitoring the relative distance between the two satellites, scientists are able to construct a detailed map of Earth's and Moon's gravity.

One can notice that the major instruments of these techniques are the ranging system called the Lunar Gravity Ranging System (LGRS) in the case of GRAIL and High Accuracy Inter-satellite Ranging System (HAIRS) in the case of GRACE. The LGRS and HAIRS measure the relative displacement of the two satellites along the path way, which is almost the orbit of the two satellites referred to as z. The ranging system, which is the heart of the current satellite gravity gradiometer technique, is based on the Doppler Effect, which measures the phase change of a wave travelling from one satellite to the other to determine the change of the relative distance between the two satellites. However, such a ranging system only measures the distance along the axis of propagation of the E&M (electromagnetic) field, while not making any measurement on the two other perpendicular directions, thus being unable to construct a full tensor gradiometer. It is noteworthy to observe that the most frequently used and intuitive component of the gravity field is the vertical gravity gradient, which for a circular orbit is perpendicular to the direction of propagation of the two satellites. Indeed, the orbit of the satellites is assumed to be a surface of constant gravity potential U and let $r_1$ and $r_2$ be positions on the surface (i.e., with $U_1$ and $U_2$=U), then the component of g along the axis of the orbit is zero.

The g=−grad·U has no components along the axis of the orbit. This illustrates how important is it to measure the relative displacement of the two satellites in the plane horizontal to the axis separating the two satellites, which the currently technology based on the Doppler technique doesn't address.

Accordingly, what is needed is the ability to accurately (e.g., without a significant impact due to noise) measure the relative displacement between two satellites in three (3) dimensions without relying on a signal's phase.

SUMMARY OF THE INVENTION

Embodiments of the present invention allow the measurement of the relative displacement between the two satellites in the two directions that the Doppler technique doesn't allow, thus the three-dimensional relative displacement vector, ($\Delta L_x, \Delta L_y, \Delta L_z$), (a vital observable for reconstructing the components of the gravity field) can be reconstructed. More specifically, embodiments of the invention measure the relative displacement between the two satellites by monitoring the displacement of the spot light created on one of the two satellites from a light beam shined from the other satellite. This technique is singular in the sense that it doesn't rely on the phase of the light, measuring directly the relative displacement of the two satellites as opposed to a radar technique that measures the change of the phase and relates this change to the change of the distance. By monitoring the relative displacement between the two satellites, the relative displacement can be related to the relative acceleration between the two satellites using:

$$\Delta a_y = \frac{[\Delta L(t_1)_y - 2\Delta L(t_2)_y + \Delta L(t_3)_y]}{2t_d^2}, \quad \text{(eq. 1)}$$

with $$t_2 = t_1 + t_d$$

and $$t_3 = t_1 + 2t_d$$

where $t_d$ is the detection rate (the time separation between two consecutives measurement). It may be noted that for measuring the relative displacement, one doesn't need to know the distance separation between the two entities and embodiments of the invention directly measure the relative displacement between the two; as opposed to the Doppler Effect, which deduces the relative displacement by measuring and calculating the phase induced by a wave travelling from one satellite to the other one and by monitoring the change in the phase of the wave at the detection. By using drag-free accelerometers that provide measurements to remove non-gravitational forces, one may deduce (from the previous equation) the variation of the gravity vector along the y direction. This equation could be extended to the three spatial directions.

The displacements that one is looking for are relatively small and at most tens of μm. As an example, mountains induce a change in the gravitation force acceleration of several 10 μm/s$^{-2}$, [3]. GRAIL and GRACE are reporting a resolution of respectively 4 and 10 μm/s [1, 2], which means that they need a longer integration time to detect a structure of higher resolution while also requiring a longer baseline. Also the resolution limit of their ranging system doesn't allow them to detect fine human made underground structures. Distinguishably, embodiments of the present invention allow a relative displacement between the two satellites as small as few $10^{-18}$ m/s, which is twelve orders of magnitude better than what GRACE and GRAIL are capable of. This implies that one is able to detect the relative acceleration between the two satellites as small as few $10^{-18}$ m/s$^2$ or $10^{-17}$ m/s$^2$. In order to have an idea of its significance, let's assume that the existence of an underground tunnel of infinite length of radius R=5 m, buried underground at a depth Y=200 m in a material made of concrete of density ρ=2.4 g/cm$^3$. The perturbation in the vertical component of the gravitational acceleration $\Delta g_y$ is given by [4];

$$\Delta g_y (10 \ \mu m/s^2) = 0.2 \left(\frac{R}{5 \, m}\right)^2 \left(\frac{(Y+h)}{10 \, m}\right)^{-1} \left(\frac{\rho}{2 g cm^3}\right) \quad \text{(eq. 2)}$$

For a pair of satellites flying at an altitude of h=500 km, this requires measuring the change in the relative distance with a precision of 4.8×10$^{-12}$ m/s$^2$, which the ranging systems used by GRAIL or GRACE don't provide. GRACE or GRAIL are looking for structures underground or on the surface for which the change in the gravity field induced by it is within their ranging system detection abilities, meaning a few μm/s$^2$. This change in the gravity field is commonly provided by a relatively rough resolution's structure of few tens or hundreds of kilometers, that is why the distance between their two satellites is within this range.

The precision that is required for detecting the example of the buried underground tunnel structure is $10^6$ times smaller than what GRAIL and GRACE can achieve in one second. In order to reach such resolution, GRAIL and GRACE would need to integrate over a period of $10^{12}$ seconds, which is equivalent to more than thirty one thousand years of integration time. Embodiments of the present invention reach such resolution by just integrating over 1 ns. Due to the high resolution of detection in embodiments of the invention, one can detect the change of the gravity field induced by structures of a few meters in diameter that are buried deep underground. Thus, embodiments of the invention can afford to have a separation distance between the satellites as small as few meters or even smaller.

Embodiments of the invention also provide a fast data rate acquisition time. GRAIL and GRACE are interested in long integration time for purposes that include; monitoring long term trend change on the planet's gravitational potential and the need to collect many data points to decrease the statistical error restrained by their ranging systems resolution of few μm/s. The ranging systems of GRAIL and GRACE are based on the dual one-way ranging system that has the advantage of eliminating onboard Ultra Stable Oscillator noise for detection time longer than the time it takes for the light to travel from one satellite to the other one, which is typically in the range of ms. That also means that GRACE and GRAIL don't intend to collect data faster than a few ms. Embodiments of the invention don't have to obey such limitations; and a detection resolution (achieved by embodiments of the invention) of ~$10^{-18}$ m/s or 0.2 pm/ns is good enough to not require the long integration times used by GRAIL or GRACE.

The limitation in embodiments of the invention is a practical limit, meaning detecting data as fast as the technology used onboard allows it, basically continuously. It is not a fundamental limit as in GRAIL and GRACE. The fundamental limitation (of embodiments of the present invention) is the speed at which data can be detected and is referred to as the photon counting regime. The photon counting regime is described by the time separating two consecutive photons hitting the detector, which is much faster than the technical limit as opposed to GRAIL and GRACE where their limitation in how fast they can detect data is a fundamental limit and not a technical one. In view of the above, embodiments of the invention enable a detection time $t_d$ of 1 ns, which is technically easily feasible. If the two satellites are orbiting in low orbit of earth, typically few hundred kilometers, they have a velocity of few km/s. Such properties enable embodiments of the invention to detect data on the ground every μm.

BRIEF DESCRIPTION OF THE DRAWINGS

Referring now to the drawings in which like reference numbers represent corresponding parts throughout:

FIG. 3A illustrates an initial case where no relative displacement occurs in accordance with one or more embodiments of the invention;

FIGS. 3B and 3C depict cases where there is a relative displacement in accordance with one or more embodiments of the invention;

Figure 6:
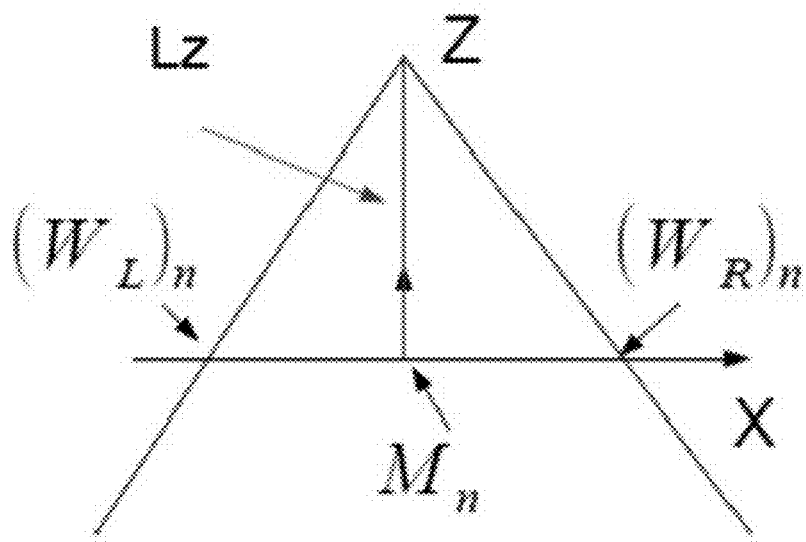
Figure 7:
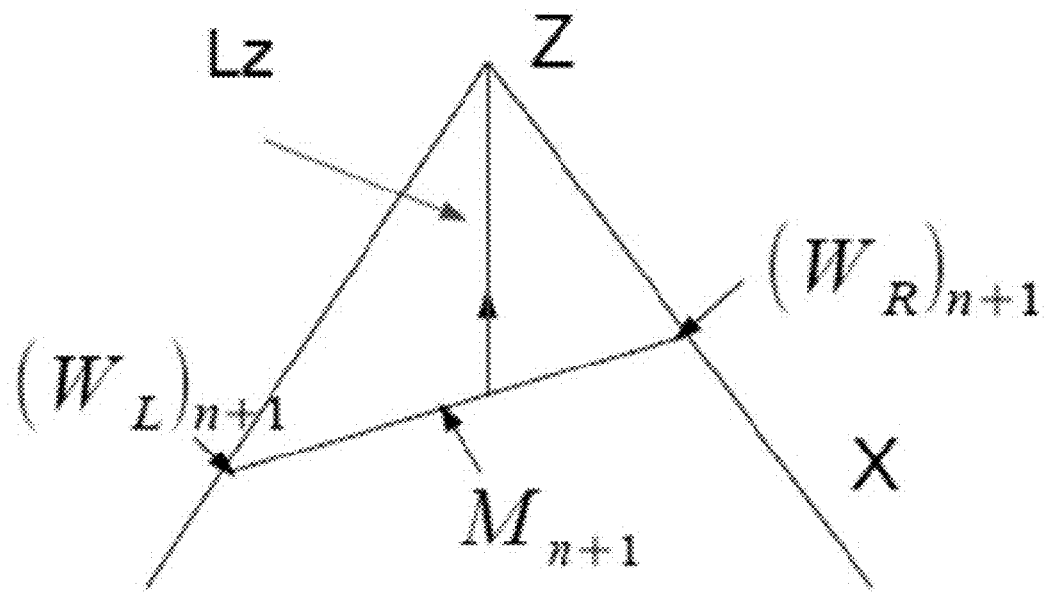
Figure 8:
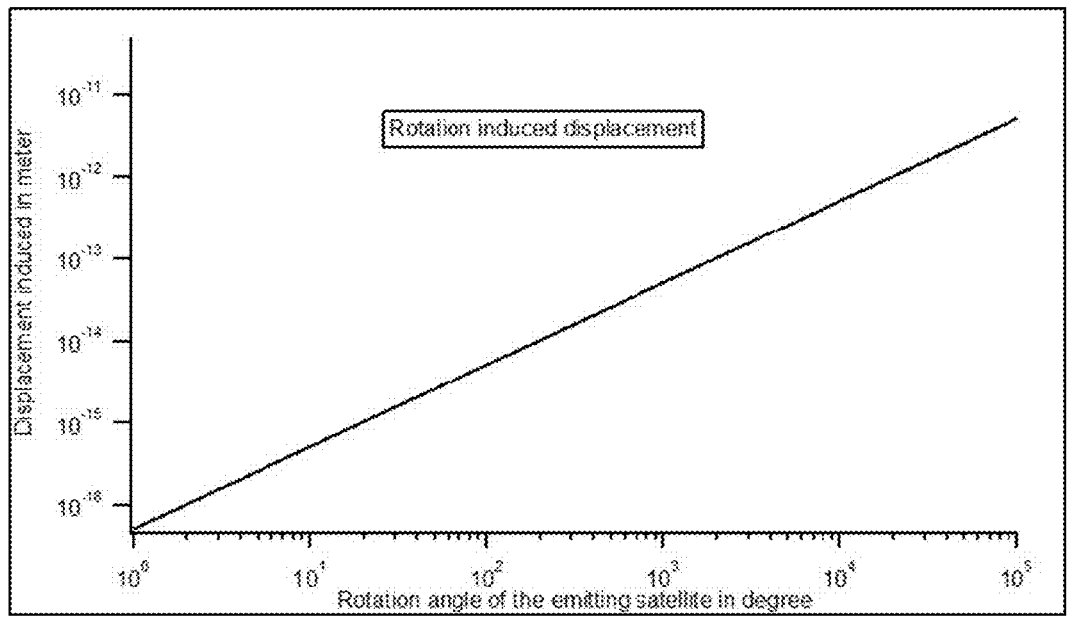
Figure 9:
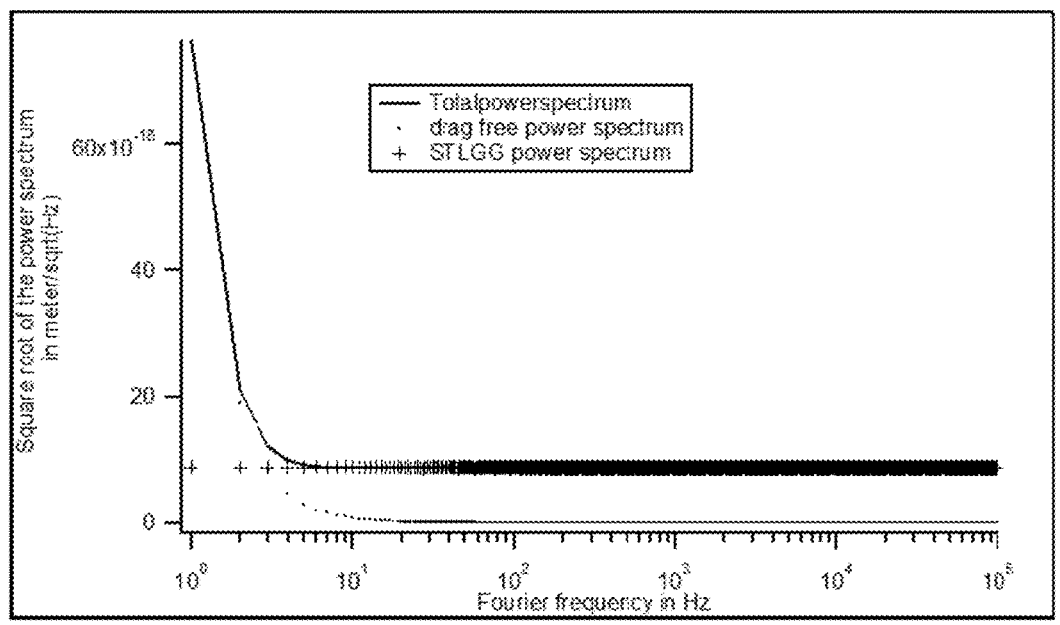
Figure 10:
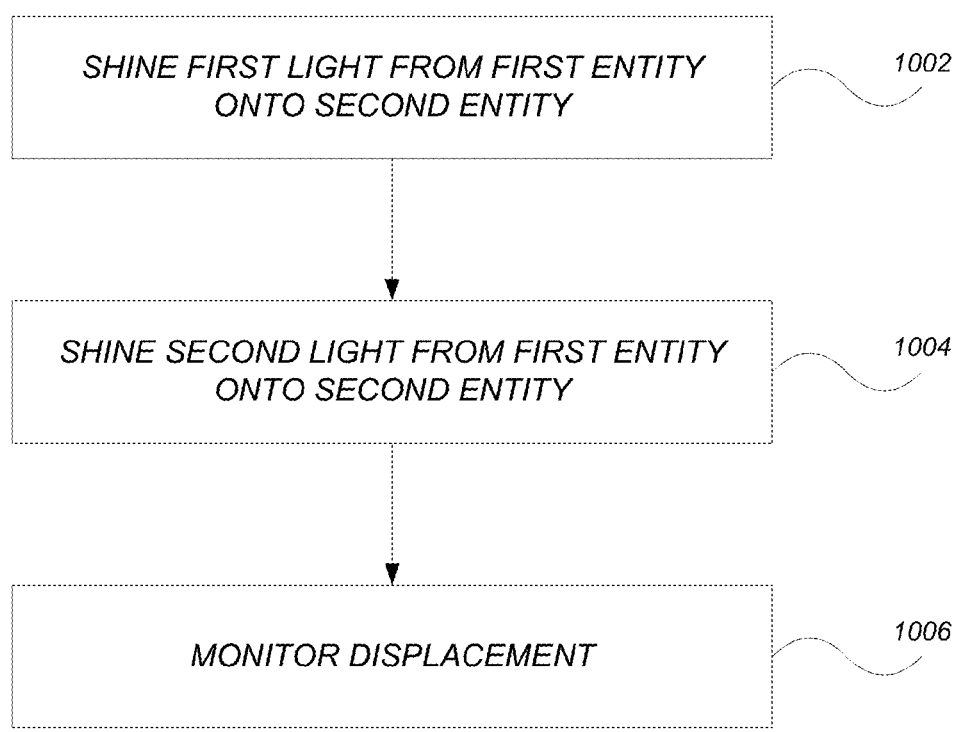
Figure 11:
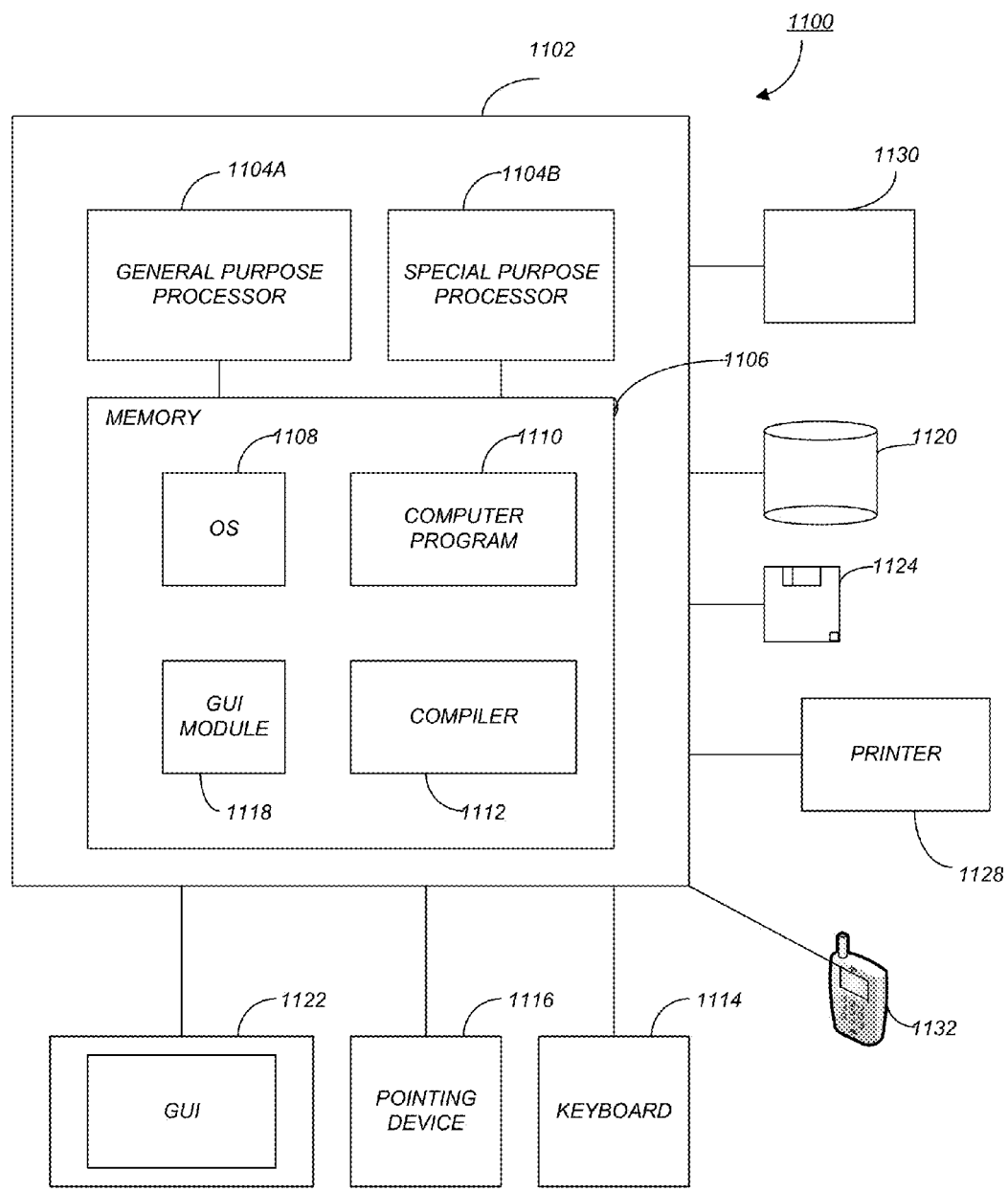

5B) focuses the incoming light in a different PMT in accordance with one or more embodiments of the invention;

FIG. 6 illustrates a one-dimensional amplified scheme of where the light-beam hits, depicted by a cone in accordance with one or more embodiments of the invention;

FIG. 7 illustrates a simplified scheme of the rotation of one satellite relative to the incoming light in accordance with one or more embodiments of the invention;

FIG. 8 represents the displacement induced by the rotation of the detecting satellite relative to the z axis separating the two satellites in accordance with one or more embodiments of the invention;

FIG. 9 represents the square root of the power spectrum density of the noise of the relative displacement between the two satellites versus the Fourier frequency, which is the frequency at which data is taken in accordance with one or more embodiments of the invention;

FIG. 10 illustrates the logical flow for measuring a relative displacement and rotation in accordance with one or more embodiments of the invention; and FIG. 11 is an exemplary hardware and software environment used to perform computations in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Qualitative Description

To understand embodiments of the invention, a qualitative description is useful, followed by a the derivation of an analytical expression.

One may assume the existence of two satellites and it is desirable to measure their relative displacement by monitoring the displacement of a beam of light located on one of the satellites and shining to a plate fixed to the other satellite. FIGS. 1(a) and 1(b) illustrate the general concept of shining light between two satellites and measuring a relative displacement in accordance with one or more embodiments of the invention. Assume that the light source is located on satellite 1 and shines 102 continuously on satellite 2. Therefore, the direction of propagation (Z) of the emitted light 102 never changes, relative to satellite 1. Assume that the light source shines 102 on a plate ($P_2$) located in the (x,y)-plane and is fixed to satellite 2. FIG. 1(a) illustrates the initial setup of such a configuration. If the location of the two satellites, relative to each other, does not change, then the light-spot on satellite 2 remains at the same location on plate $P_2$. It is assumed that, initially, without any relative displacement of the two satellites, the light source shines 102 at the center $O_2$ of $P_2$. It is also assumed that one satellite is displaced from the other satellite in a direction perpendicular to the X direction of propagation of the light. If this distance, relative to satellite 2 is $\vec{\Delta L}$, then the light-spot is displaced from $O_2$ by the same amount (as depicted in FIG. 1(b)).

Figure 1:
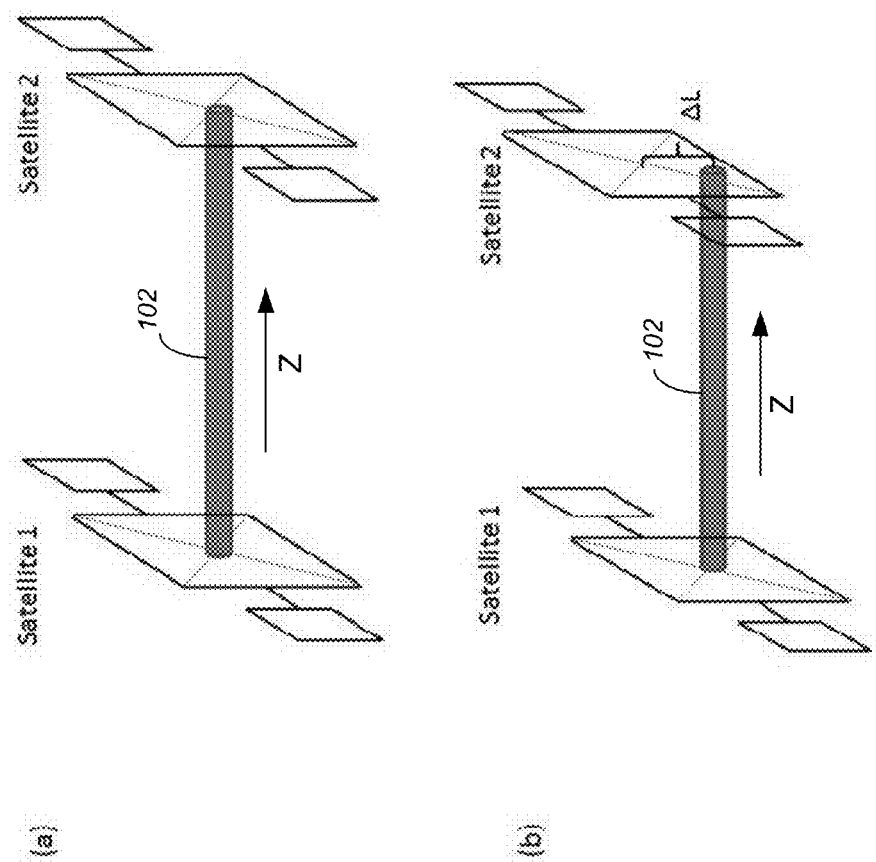
FIGS. 1(a) and 1(b) illustrate the general concept of shining light between two satellites and measuring a relative displacement in accordance with one or more embodiments of the invention.

While one is able detect the relative displacement of the two satellites normal to the direction that the light propagates, one is not able to detect a relative displacement parallel to the direction where the light propagates, which is Z as shown in FIG. 1. This particular restriction can be surpassed of one considers using either the conventional Doppler Shift technique or the scheme depicted in FIG. 2 to measure the relative displacement along the radial axis in the Z direction. The latter scheme will reveal the three-dimensional displacement vector $\vec{\Delta L}$ ($\Delta L_x$, $\Delta L_y$, $\Delta L_z$) between the two satellites. One can then collect at least two sets of independent data.

Figure 2:
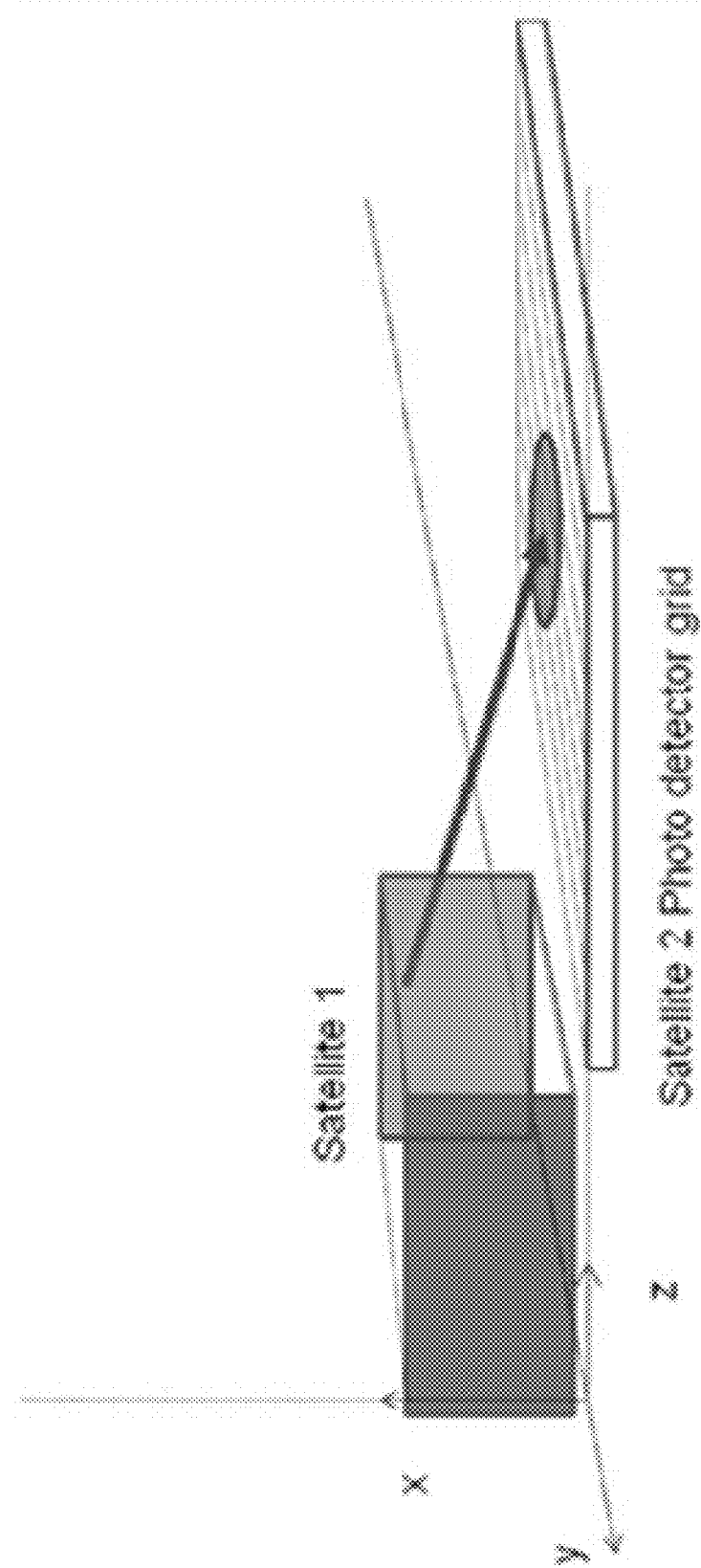
FIG. 2 illustrates a satellite detecting the (Y,Z) components of a relative displacement between the two satellites in accordance with one or more embodiments of the invention.

In the scheme of FIG. 2, a light source is emitted from satellite 1 that propagates in the Z direction and is monitored on a two-dimensional plate located in the (X,Y) plane, and an additional light source located in satellite 1 that propagates in the (Y,Z) plane and is detected by a two-dimensional plate located in the (Z,Y) plane. The latter scheme will reveal the three-dimensional displacement vector $\vec{\Delta L}$($\Delta L_x$, $\Delta L_y$, $\Delta L_z$) between the two satellites. Accordingly, at least two sets of independent data may be collected. Thus, FIG. 2 illustrates a satellite detecting the (Y,Z) components of a relative displacement between the two satellites in accordance with one or more embodiments of the invention. As background for the concept of determining displacement along a single axis, one may refer to [6] which is incorporated by reference herein.

As well as monitoring the change in the relative distance between the two spacecrafts, it is also useful to recognize which spacecraft causes the change. Here, one may define (1,2) and (2,1) as changes that occur relative to satellite 1 and 2, respectively. For example, is it a trajectory change of satellite (1,2) that causes a relative displacement between the two satellites? This is done by using a two-way detection scheme, where spacecraft 1 is lasing at spacecraft 2, but simultaneously, spacecraft 2 is also lasing at spacecraft 1.

FIG. 3A illustrates an initial case where no relative displacement occurs. FIGS. 3B and 3C depict cases where there is a relative displacement in accordance with one or more embodiments of the invention. When there is no change in the relative displacement between the two satellites, the light source from satellite (1,2) illuminates at the origin of the plate located on satellite (2,1) as depicted in FIG. 3A.

One may assume that at time $t_0$, satellite 1 moves and causes a change in the separation distance between the two spacecraft as depicted in FIG. 3B. One nano-second later, spacecraft 1 observes a displacement of the light being detected on its photo-detector matrix, coming from spacecraft 2. After the light travels from spacecraft 1 to spacecraft 2, spacecraft 2 will observe a displacement of the spot-light shining on its photo-detector matrix. If one considers that the distance between the two spacecrafts is 10 m, and data is being acquired every ns, then the time it takes for the light to propagate from one spacecraft to the other is roughly 3.333 μs, corresponding to 3333 different data-sets, which corresponds to the acquisition of 3333 data-sets.

Similarly, as illustrated in FIG. 3C, if satellite 2 moves and satellite 1 is stationary, at the next detection cycle, the emitted light from satellite 1 causes a separation distance with respect to satellite 2. A similar change is recorded by satellite 1 with a delay associated with the duration taken for the light to travel from satellite 2 to satellite 1. This exemplifies a two-way-scheme, where each spacecraft sends and receives light from the other spacecraft, which allows for determining which spacecraft causes a change in the separation distance of the two spacecrafts—i.e., as long as the data is collected at least twice as fast the time it takes for the light to travel from one spacecraft to the other one.

Analytical Expression and General Notation

One may assume that each light source is secured and fixed to its respective satellites. The detection plane at satellite 2 may be arbitrarily chosen to be located in the (x,y)-plane, such that the z-axis is normal to the plane of detection. $M_{t_0}$, is denoted as the location on the plane where the center of the beam emitted from satellite 1 is projected, with a direction of propagation $\vec{k}_1$, at time $t_0$. One may assume that between $t_0$ and $t_1$, satellite 2 displaces by $\vec{\Delta L_2}$ from satellite 1, resulting in $$\vec{M_{t_0}M_{t_1}} = [\Delta L_{2x}]\vec{u}_x + [\Delta L_{2y}]\vec{u}_y. \quad \text{(eq. 3)}$$

Therefore $\Delta L_{2x} = (M_{t_0}M_{t_1})$ and $\Delta L_{2y} = (M_{t_0}M_{t_1})$. If one takes into account the displacement $\vec{\Delta L_1}$ induced by the first satellite, which takes a time $$\frac{L}{c},$$

(L is the distance between the two satellites, and c is the speed of light in vacuum) before reaching satellite 2, then, $$\vec{M_{t_0}M_{t_0+t}(t)} = \quad \text{(eq. 4)}$$
$$\left(\Delta L_{2y}(t) - \Delta L_{1y}\left(t - \frac{L}{C}\right)\right)\vec{u}_y + \left(\Delta L_{2y}(t) - \Delta L_{1y}\left(t - \frac{L}{C}\right)\right)\vec{u}_z,$$

Likewise, the displacement of the beam on satellite 2 can be measured, which doubles the number of equations and, therefore, via the Fourier or Laplace transform, allows for the construction of the three-dimensional displacements $\Delta L_2$ and $\Delta L_1$.

Detection

Figure 4:
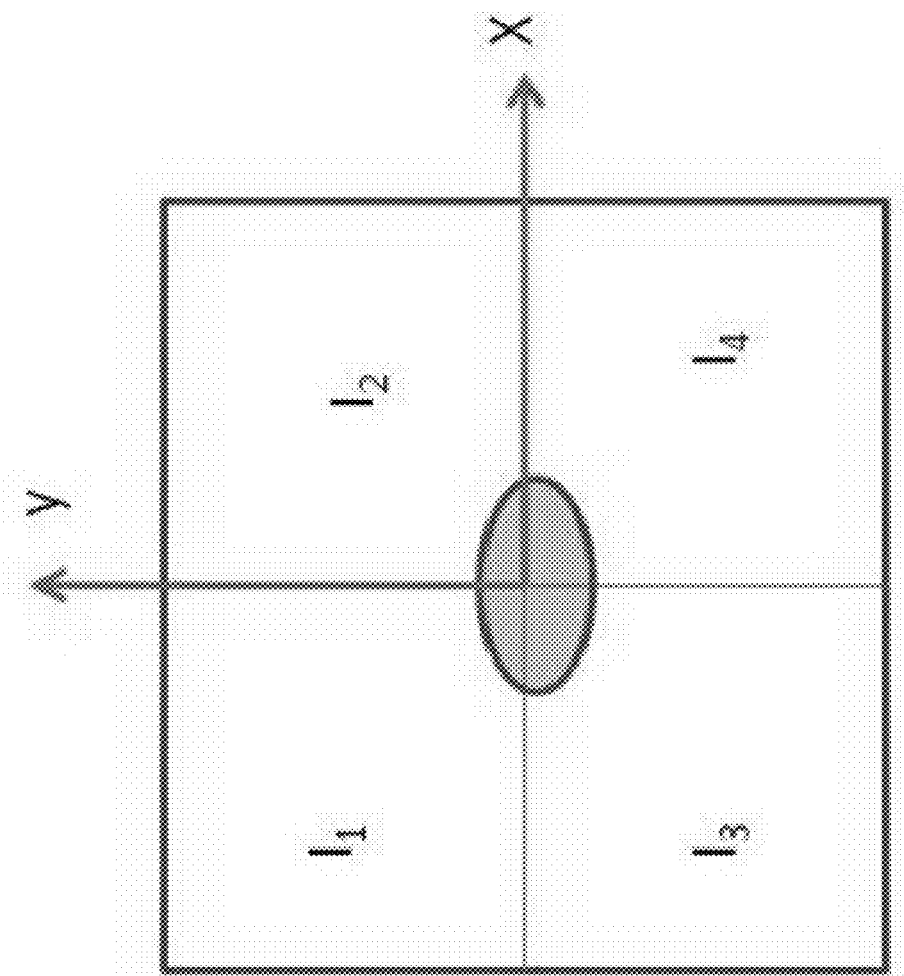
FIG. 4 illustrates a schematic of a quad cell technique in accordance with one or more embodiments of the invention.
Figure 5A:
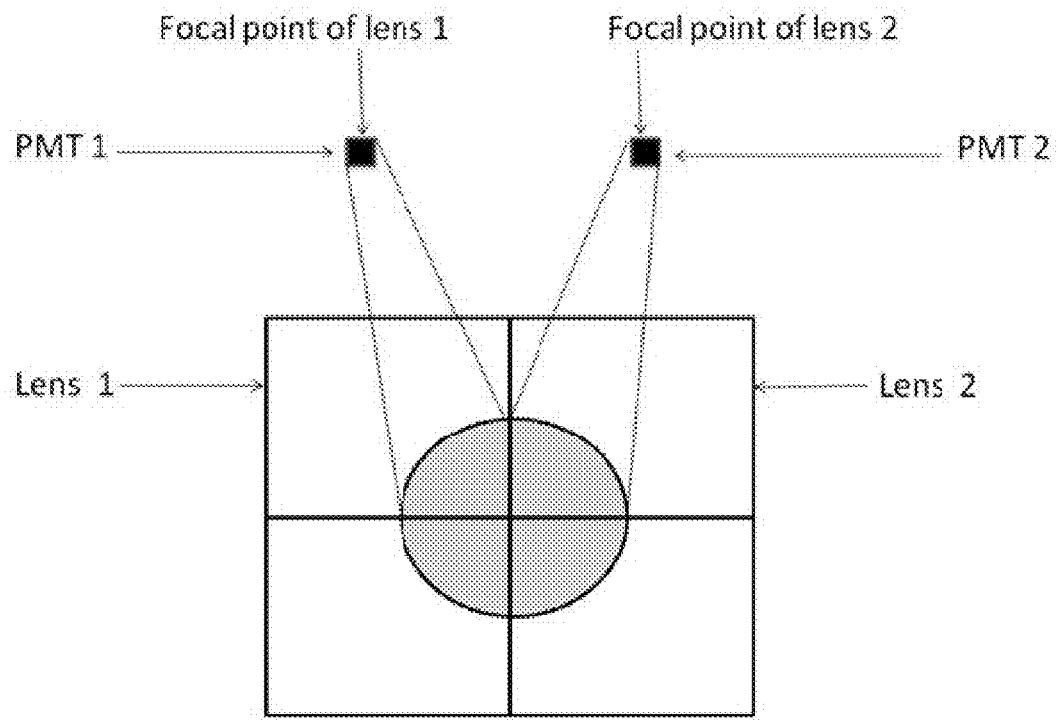
FIG. 5 illustrates an ensemble of four lenses (FIG. 5A) or mirrors (FIG. 5B), where each lens (FIG. 5A) or mirror (FIG.
Figure 5B:
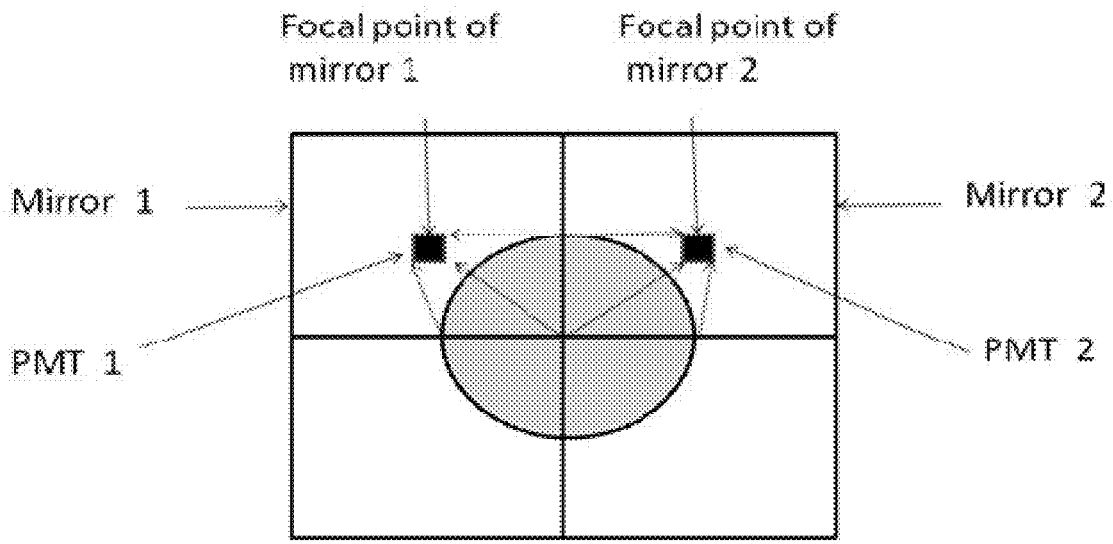

This section describes two different modes of detection which are depicted in FIGS. 4, 5A, and 5B. In this regard, incoming light may be detected without using any mirror at the detection, or using an ensemble of mirrors, where each one of the mirrors focuses the incoming light into a different PMT (Photo Multiplier Tube).

FIG. 4 illustrates a schematic of a quad cell technique in accordance with one or more embodiments of the invention. FIG. 5 illustrates an ensemble of four lenses (FIG. 5A) or mirrors (FIG. 5B), wherein each lens (FIG. 5A) or mirror (FIG. 5B) focuses the incoming light in a different PMT. This method of detection, similar to the Shack-Hartmann wavefront sensing technique, can be used to measure smaller relative displacements as the lenses produce focused light beams, collected by their respective PMTs, compared to the more dispersed light beam, which initially hits the lenses prior to being focused. Hence, using the quad cell technique with lenses or mirrors to focus the beam to its optical limit of $$\sim \frac{\lambda}{\pi},$$

one can measure relative displacements as small as $$\frac{\lambda/\pi}{\sqrt{G \cdot N_{photon}}}$$

~a few pico-meters per ns as in the specific example described herein.

Given a light beam's width, W, and signal size, SS $$SS = N_{photon} \cdot G, \quad \text{(eq. 5)}$$

equals the number of photons $N_{photon}$ detected multiplied by the gain G of the Photo Multiplier Tubes (PMTs). The quad cell technique of FIG. 4 can be used to detect its displacement, $\Delta L$, with a resolution of $$\frac{W}{\sqrt{SS}} [5],$$

which is equal to $$\frac{W}{\sqrt{N_{photon} \cdot G}}$$

per detection. If the detection rate is $t_d$, then each second, $t_d$ different data is detected, which leads to the detection resolution per second to be:

$$\Delta L(\text{meters/second}) = \frac{W(\text{meter})}{\sqrt{N_{photon} \cdot G}} \cdot \sqrt{t_d(\text{second})} \quad \text{(eq. 6)}$$

In the quad cell technique, the detection panel is at least decomposed of four quadrants, each one corresponding to a different photo-detector. Let one denote i={1,2,3,4}, as the four quadrants, and $(I_i)_{t_0}$, as the light intensity (I), collected by a quadrant i at $t_0$ time [6]. If the beam experiences a displacement, $\Delta L$, between $t_0$ and $t_1$, then its x-component, $\Delta L_x$, can be measured as:

$$\Delta L_x \simeq W \cdot \left(\frac{(I_2 + I_4) - (I_1 + I_3)}{I_1 + I_2 + I_3 + I_4}\right)_{t=t_1} - W \cdot \left(\frac{(I_2 + I_4) - (I_1 + I_3)}{I_1 + I_2 + I_3 + I_4}\right)_{t=t_0}. \quad \text{(eq. 7)}$$

Likewise, its y-component, $\Delta L_y$, can be measured as:

$$\Delta L_y \simeq W \cdot \left(\frac{(I_1 + I_2) - (I_3 + I_4)}{I_1 + I_2 + I_3 + I_4}\right)_{t=t_1} - W \cdot \left(\frac{(I_1 + I_2) - (I_3 + I_4)}{I_1 + I_2 + I_3 + I_4}\right)_{t=t_0}. \quad \text{(eq. 8)}$$

In order to obtain the scheme shown in FIG. 4, one can either directly detect the incoming light without using any mirrors at the detection or by using an ensemble of four (4) lenses (e.g., Lens 1 and Lens 2), where each lens focuses the incoming light into a different PMT (e.g., PMT 1 and MPT 2) as illustrated in FIGS. 5A and 5B. FIGS. 5A and 5B illustrate that this method of detection can be used to measure smaller relative displacements as the lenses produce focused light beams, collected by their respective PMTs, compared to the more dispersed light beam, which initially hits the lenses prior to being focused. Hence, using the quad cell technique with lenses to focus the beam, relative displacements of ~a few pico-meters per detection [7] (meaning nano-second) can be measured.

A single lens (or mirror) solely would not allow for a relative displacement measurement of the incoming light as it focuses it to the same point independently of the motion of the incoming plane-wave light; the mirror will always focus it at the same location, which is its focal plane. In other words, the focal plane of a lens or mirror is fixed and independent of the proprieties of the incoming light. Focusing the incoming light with a single lens results in the loss of information related to the displacement of the light. In order to overcome this problem embodiments of the invention utilize four (4) different lenses/mirrors—each one focusing a quadrant of the incoming beam to its respective focal point, where a PMT is located at each focal plane. As the incoming beam moves, the relative light intensities detected by each PMT change accordingly—thus, allowing for the reduction of the incoming light beamwidth hitting the lenses, which in turn, allows that focused beam to reach its optical/fundamental size limit, which is $$\sim \frac{\lambda}{\pi} = 0.2 \ \mu m,$$

if $\lambda$ is 633 nm, [7]. The quad cell technique (applied to the 4 PMTs) then quantifies the relative displacement by measuring the relative change in light intensities between respective PMTs, [5]. Given that W is reduced to its fundamentally smallest optical size; this relative displacement is equal to that experienced by the light hitting the lens prior to being focused at each quadrant.

Noise Analysis

Embodiments of the invention may utilize a technique similar GRACE and GRAIL to decouple non-Earth gravitational field forces from Earth gravitational field forces, both of which induce a relative displacement between the two satellites. Similar hardware, such as drag-free accelerometers and software can also be used in embodiments of the present invention. The sources of error in such a technique are quantitatively delineated in the following section. For example, embodiments of the invention enable a greater resolution of detection, which implies shorter integration times, and allows the detection of gravity anomalies caused by relative smaller structures; this correlates to integration times varying from a few nanoseconds to, at most, fractions of seconds. Described below is an examination of the systematic errors that occur at timescales longer than integration times, which may not be the case for GRAIL and GRACE. In addition, as described herein, a two-way detection scheme of embodiments of the invention may further help in selecting the useable data.

Pointing Stability

For a light half-width of 1 mm at a satellite separation-distance of 10 m, a pointing stability of 5 milli-degree of the emitting light is required to not lose track of the light at the detection plane/panel. To have an idea, LISA (Laser Interferometer Space Antenna) reports a pointing stability of 7 nano-rad [8], seven orders of magnitude better than what may be required. Amon et al. [9] deploys an optical architecture, similar to embodiments of the invention, where the separation between the two satellites is 3000 km.

Depending on the architecture of the satellites, it is expected that the range of the vibrations or the wobbling of the satellites that are mechanical motions will only be a few Hz to tens of Hz. These vibrations happen at frequencies that are much smaller than embodiments the invention's GHz rate of detection. Therefore, they can be seen as systematic and can be treated accordingly, given that due to high resolution of detection, one expects to not need long integration time. As seen earlier, a relative displacement between the two satellites imply a displacement of the light beam at one satellite that is the opposite of the one collected at the other satellite. If satellite wobbling is the source of the recorded displacement, the previous criteria is no longer satisfied. In other words, if the emitted satellite shakes such that the detection beam hits a/point(s) outside the detection panel, the associated data is automatically discarded. This could then be used to eliminate the data that is thought to be caused by wobbling rather than the relative displacement between the two satellites. The trend of the wobbling and vibration of each satellite could be modeled (as a function of frequencies, angles, directions) and simulated before flight. This model could be used to treat the wobbling as a systematic process that can be used to differentiate erroneous from useable/real data. Overall, sensors may be installed on the satellites, that monitor in real-time the physical variable that could lead to the wobbling of the satellite. For example, let one say that the change of ambient temperature or the radiation pressure induces a certain degree of wobbling to the satellite. By having earlier learned and tested experimentally how these changes induce wobbling and modeling them, it is possible to monitor, in real-time, the light-beam wobbling induced displacement, and separate such displacement from the one induced by the relative displacement of the two satellites. Thus, such data can be extracted from the wobbling noise.

Clock Noise

One of the advantages of embodiments of the invention, over the phase measurement technology, consists of not being limited by the Ultra Stable Oscillator (USO) noise in high frequency. Even in the case of a Dual One-Way-Range measurement, which reduces the USO noise, a cutoff-frequency for data acquisition exists where the USO noise can no longer be reduced, thus deteriorating strongly the signal to noise ratio. Within this context, as long as the frequency at which data is collected is less than $$\frac{C}{L},$$

then the USO noise cancels. This limitation is governed by the time it takes for a wave to travel from one satellite to the other [10]. Embodiments of the invention do not have this limitation since the relative displacement of the two satellites with respect to each other is being measured continuously. This yields many advantages, such as monitoring very fast processes that induce changes in the gravity potential experienced by the two satellites; low-resolution data products at the surface and subsurface can then be resolved.

Medium-Induced Noise

In the case of a phase detection system, such as Radar or Lidar, the medium in which the signal propagates can induce a phase error since its index of refraction can change due to a change in the concentration of charged particles, such as electrons. This particular error does not exist in embodiments of the invention, as the Doppler Shift technique is not used. Instead, the relative displacement of the satellites caused by a change in the gravity field of a planetary body is measured. However, impurities in the medium can cause the scattering of the light. Changes in the scattering of the light over its respective time-scale might induce an error(s), which likely is much longer than the time separating two consecutive detections. One should realize that since a differential measurement between two different times is being performed, any source of error that is constant over this period will be canceled.

Effect of Non-Gravitational Forces

Non-gravitational forces, including atmospheric drag, solar radiation pressure, Earth radiation pressure, thrust, etc., can also induce a relative displacement of the two satellites [10]. Similar to GRACE, GRAIL and LISA, a drag-free accelerometer may be used at the center of mass of each satellite, which only detects the total non-gravitational forces. The accelerometer measurement can be used to identify the non-gravitational force acting on the satellite trajectory and to remove its effect on the satellite trajectory estimation. If a similar drag free accelerometer is utilized (e.g., similar to one proposed for use on LISA [8]), then the square-root of the power spectrum of the acceleration noise associated with it is $$3 \cdot 10^{-15} \cdot \frac{m}{s^2 \cdot \sqrt{Hz}},$$

which corresponds to a square-root of the power spectrum of the displacement of $$\frac{3 \cdot 10^{-15} f^{-2}}{(2\pi)^2} \cdot \frac{m}{\sqrt{Hz}},$$

where f is the Fourier frequency.

Throughout the following formulation, one may assume that the intensity, I(r, z), of the beam of light exhibits a Gaussian distribution. Many lasers operate in their fundamental traverse mode, $TEM_{oo}$. This approximates a Gaussian light beam in the plane perpendicular to the direction of the propagating light. Then, the amplitude of the light intensity of the electric field has a magnitude given by:

$$I(r, z) = I_0 \cdot \left(\frac{w_0}{w(z)}\right)^2 \cdot \exp\left(\frac{-2r^2}{w(z)^2}\right), \quad \text{(eq. 9)}$$

where $$w(z) = w_0 \cdot \sqrt{1 + \left(\frac{z}{z_R}\right)^2}, \quad \text{(eq. 10)}$$

$$z_R = \frac{\pi \cdot w_0^2}{\lambda}, \quad \text{(eq. 11)}$$

r is the radial distance from the center-axis of the beam, z is the axial distance from the beam's narrowest point (i.e., the "waist," w(0)), and w(z), the waist-size), $\lambda$ is the wavelength of the light beam, and $z_R$ is the Rayleigh distance. The best resolution one can measure with any displacement of a light beam of width w(z) with a signal size Ss is [5]:

$$\Delta L = \frac{w(z)}{\sqrt{Ss}}, \quad \text{(eq. 12)}$$

which is independent of the nature of its distribution.

Skewness of the Data

One may assume that the incoming beam is not a perfect Gaussian beam but rather has some skew. Since a differential measurement is performed, any exhibited skew in the distribution of the light beam does not affect measurements in embodiments of the invention.

Change in the Wavelength

A change in the wavelength doesn't displace the beam, but changes the width of the beam, thus changing the resolution of which the displacement of the beam can be detected; therefore, $$\frac{\partial(\Delta L)}{\partial w(z)} dw(z) = \frac{dw(z)}{\sqrt{Ss}}, \quad \text{(eq. 13)}$$

$$dw(z) = \left(\frac{w_0 \cdot z}{z_R}\right)^2 \cdot \frac{1}{w(z)} \cdot \frac{d\lambda}{\lambda}, \quad \text{(eq. 14)}$$

$$d(\Delta L)_\lambda = \frac{dw(z)}{\sqrt{Ss}} = \left(\frac{w_0 \cdot z}{z_R}\right)^2 \cdot \frac{1}{w(z)} \cdot \frac{1}{\sqrt{Ss}} \cdot \frac{d\lambda}{\lambda}, \quad \text{(eq. 15)}$$

$$d(\Delta L)_\lambda = \left(\frac{w_0 \cdot z}{z_R w(z)}\right)^2 \cdot \frac{d\lambda}{\lambda}, \quad \text{(eq. 16)}$$

where Ss, the signal size of the light at the detection, is equated to $$Ss = \frac{I(r, z)}{hv} \cdot t_s. \quad \text{(eq. 17)}$$

Then $$d(\Delta L)_\lambda = \frac{d(w(z))_\lambda}{\sqrt{Ss}} = \left(\frac{w_0 \cdot z}{z_R}\right)^2 \cdot \frac{1}{w(z)} \cdot \frac{\sqrt{h \cdot v}}{\sqrt{I(r, z) \cdot t_s}} \cdot \frac{d\lambda}{\lambda}, \quad \text{(eq. 18)}$$

where $t_s$ is the time of the data acquisition, h the plank constant, and v is the frequency of the light.

Change in Intensity of the Light Beam

A change in the light beam intensity does not induce any displacement of the beam. However, it changes the resolution at which such a displacement can be detected. For instance, $$\frac{d(\Delta L)}{dI} = -\frac{1}{2} \cdot \frac{w(z)}{\sqrt{Ss}} \frac{dSs}{Ss} \quad \text{(eq. 19)}$$

since $$Ss = \frac{I(r, z)}{hv} \cdot t_s, \quad \text{(eq. 20)}$$

yields $$\frac{dSs}{Ss} = \frac{dI(r, z)}{I(r, z)}. \quad \text{(eq. 21)}$$

One then substitutes eq. 20 and 21 into eq. 19, which yields $$\frac{d(\Delta L)}{dI} = -\frac{1}{2} \frac{dI(r, z)}{I(r, z)}. \quad \text{(eq. 22)}$$

Given an integration time of a few milli-seconds, the laser intensity change is about 2% (5). This yields:

$$\frac{d(\Delta L)}{dI} \sim 1\%. \quad \text{(eq. 23)}$$

This means that the change in the intensity of the laser source, which happens at very low Fourier-frequencies, induces a change of the shot noise, at the detection of only 1%. Since this change is already insignificant at low Fourier-frequencies, this is even more negligible at high Fourier-frequencies.

Inhomogeneity in the Photo-Multipliers

One may assume that all the photo-multiplier tubes are the same and theoretically deliver the same output, $I_o$, for the same input light intensity, I. The PMTs do not all have the same dark current, $I_d$, and the same gain, G. Their respective light intensity output expression is rather written as:

$$I_o = I_d + GI. \quad \text{(eq. 24)}$$

The inhomogeneity has two components. The first one is the fluctuation of the dark current from one PMT to another. Since a differential measurement is being made, between two different times, these terms cancel—as long as they remain constant between two consecutive measurements. The second term is the variation of the gain of the PMT from one PMT to another one. The gain of each PMT can be calibrated prior to a measurement.

Rotation-Induced Displacement

An additional source of error that could interfere with the measurement is the rotation of the satellites. This is depicted by a cone, while the hitting plane is depicted by a line separating $W_L$ and $W_R$ as illustrated in FIG. 6. This causes a shift in the center of the beam as well as changes in the Gaussian distribution, including its axis, widths, and center. FIG. 6 illustrates this phenomenon, where the light propagation is described by two lines representing a cone and the plane of the detection line. In other words, FIG. 6 illustrates a one-dimensional amplified scheme of where the light-beam hits, depicted by a cone. Initially, the center of the intersection between the cone and the line is $M_n$, and the width of the intersection is $|(W_R)_n|$. As the plane of detection rotates around the z-axis with an angle α, the new center intersection segment $M_{n+1}$ differs, compared to $M_n$, and its width changes (FIG. 7). Accordingly, FIG. 7 illustrates a simplified scheme of the rotation of one satellite relative to the incoming light. The beam is depicted by the cone, while the hitting plane is depicted by a line separating $W_L$ and $W_R$.

The equation of the two lines describing the cones is:

$$Z = \pm \frac{L_z}{W} \cdot X + L_z, \quad \text{(eq. 25)}$$

where $L_z$ is the distance separating the two satellites and the equation of the detection line after the rotation is $$Z = \alpha X. \quad \text{(eq. 26)}$$

The intersection points between the cone and the line are denoted $(W_L)_{n+1}$ and $(W_R)_{n+1}$, which satisfy eq. 25 and 26. The center of these two points is called $M_{n+1}$ and denotes the new center of the light beam at the detection source. By using eq. 25 and 26, one can deduce that $$|M_{n+1} M_n| = L_z \cdot \alpha \frac{\sqrt{1+\alpha^2}}{\alpha^2 - \frac{L^2}{W^2}}. \quad \text{(eq. 27)}$$

Similarly, satellite rotation induces a change of the beam-width of $$|(W_R)_{n+1} - (W_R)_n) - ((W_L)_{n+1} - (W_L)_n)|. \quad \text{(eq. 28)}$$

It is expected that the displacement caused by a rotation occurs on timescales much longer than a nano-second detection time, and therefore, can be treated as a systematic component.

Numerical Application

One can assume that the distance separating the two satellites is 10 m, and a He/Ne laser is used, emitting at 632.9 nm. The half aperture-size of the spherical mirror collimating the light at the emission is w(0)=1 mm; therefore, its width at the reception is w(z)=2.25 mm. One can either detect the beam directly without changing its beam-width by deploying a batch of Photomultiplier Tubes or using a setting similar to FIGS. 5A and 5B, which shrinks the beam-width (with the aid of at least 4 lenses) to $$\sim \frac{\lambda}{\pi} = 0.2 \ \mu m.$$

If one assumes that 4 million photons hit the PMTs, at each timeframe for detection, with the gain G of $10^6$ for each PMT, the resolution of measuring the relative displacement of the two satellites per detection ($t_d$) of 1 ns is:

$$\Delta L = \frac{W}{\sqrt{SS = G \cdot N_{photon}}} = \frac{0.2 \ \mu m}{\sqrt{10^6 \cdot 10^6}} /ns$$

$$= 0.2 \ pm/ns.$$

Within 1 s of integration time, one collects $10^9$ data, therefore an integration time of 1 s will reduce the shot noise error of the measurement by a factor of $\sqrt{t_d = 10^{-9}}$ which corresponds to a displacement of 0.2 pm. $\sqrt{10^{-9} \cdot s^{-1}}$ equals to $6.32 \times 10^{-18}$ m/s.

This scheme requires a light intensity at the detection of 1.26 mW. Taking into account the attenuation factor of the light between the emissions to the detection of $$\left(\frac{w(z)}{w(0)}\right)^2 = 5.0625,$$

yields an emission intensity of 6.35 mW. Table 1 and 2 (below) provide a complete summary of all parameters associated with the design and noise-related sources.

TABLE 1

Numerical value of various physical parameters.

| Satellites | |
|---|---|
| Distance of separation between satellites | 10 m |
| Satellites speed on earth | 7.8 km s$^{-1}$ |
| Satellite altitude | 500 km |
| Spatial resolution on earth | 7.8 mm |
| Detection time | 1 ns |
| Beam | |
| Beam width w(0) | 1 mm |
| Spherical mirror aperture size at emission | 2 mm |
| Beam width at the second satellites w(z) | 2.25 mm |
| Lenses size at detection | 50 mm |
| Beam width at the PMT's | ~µm |
| Rayleigh distance | 4.96 m |
| PMT'S | |
| PMT's size | Few mm |
| Detection time | 1 ns |
| Gain | 1 millions |
| Number of photons detected per PMT | 1 millions |
| Total number of photons at detection | 4 millions |
| Laser | |
| Laser wavelength | 632.9 nm |
| Laser intensity | ~2.11 mw |
| Relative displacement detection resolution per detection time | 0.28 pm |

TABLE 1-continued

Numerical value of various physical parameters.

| | |
|---|---|
| Relative displacement detection resolution per second | $6.32 \times 10^{-18}$ m/s |
| Detection time $t_d$ | 1 ns |
| Light's intensity attenuation $\left(\frac{w(z)}{w(0)}\right)^2$ | 5.06 |
| Intensity at detection | ~1.26 mW |
| Intensity at emission | ~6.35 mW |

TABLE 2

Noise sources and measurement resolution changes.

| | Displacement induced | Displacement Resolution change |
|---|---|---|
| Laser intensity change | None | $\frac{d(\Delta L)_I}{\Delta L} = \frac{dI}{I} < 2\%$ |
| Laser wavelength change | None | $\frac{d(\Delta L)_\lambda}{\Delta L} = 0.8 \times 10^{-4.5} \frac{d\lambda}{\lambda}$ |
| PMT dark current | None | None |
| PMT inhomogeneity | None | None if calibrated |
| Mirrors inhomogeneity | None | None at first order if calibrated |
| Relative satellite rotation | <1 µm per rotation | Pico meter |
| Drag free accelerometer | $3.10^{-15} \cdot \frac{m}{(2\pi f)^2 \sqrt{Hz}}$ | $3.10^{-15} \cdot \frac{m}{(2\pi f)^2 \sqrt{Hz}}$ |

FIG. 8 represents the displacement induced by the rotation of the detecting satellite relative to the z axis separating the two satellites. Crucial missing information is the timescale at which these rotations take place. One expects the rotations to happen in a timing range larger than the detection rate utilized in embodiments of the invention. For a large rotation, the techniques discussed above (e.g., in the Pointing Stability section) may be used to differentiate the real data from the one induced by the rotation of the satellites and therefore treating the latter as systematics. One may also note that the required relative pointing stability of the spacecraft in the case of LISA where the satellites are meant to be 5 million kilometers apart, is $\delta\theta$~7 nrad/$\sqrt{Hz}$ [8], which is the square-root of the power spectrum density of the angular fluctuation $\delta\theta$ which corresponds to 0.4 µdeg.

One feature of FIG. 8 is that for the range of the angle of interest, the induced displacement is a linear function of the rotation angle, which may facilitate the extraction of the rotation induced displacement's pattern from the collected data. In addition, one can actually fulfill the requirement to differentiate data by intentionally alleviating many stringent requirements on the satellites by allowing them to rotate in ranges that induce displacement of a few orders of magnitude larger that the range of displacement that is sought. Such an approach enables one to differentiate the data being sought from systematics. Essentially any source of error that the frequency associated with is different than the expected short integration time. In addition, if the magnitude of its induced measured displacement is different than the ones induced by the structures sought, it is possible to extract it from the measurements.

With regard to laser-induced errors, one may observe that laser intensity and wavelength fluctuations induce changes in the resolution of measuring a relative displacement that are quite negligible compared to the shot noise of the measurement. One can also show that the intensity of the light beam for measurements require low power and is in the range of the power of commonly/widely used lasers. Furthermore, embodiments of the invention do not require any specific stabilization feature for potential laser sources, as those already available on the market may fulfill any necessary requirements.

For the LISA mission, the drag-free accelerometer meant to decouple the non-gravitational force from the gravitational force induced-displacement is a function of the square-root of its noise power spectrum of the drag-free accelerometer—i.e., $$3 \times 10^{-15} / (2\pi f)^2 \frac{meters}{\sqrt{Hz}}.$$

[8]. FIG. 9 represents the square root of the power spectrum density of the noise of the relative displacement between the two satellites versus the Fourier frequency, which is the frequency at which data is taken. For instance, it is known that the corresponding shot-noise of each measurement is 0.2 pm per detection time. For each measurement, one has to account for the noise contribution of the displacement caused by both satellites, which can then be summed till a threshold of 0.28 pm. If one defines $\Delta L(f)=(\Delta L)^2 t_d$, as the power spectrum density of the relative displacement, such a definition leads to $$\Delta L(f) = 7.84 \times 10^{-35} \frac{meters^2}{Hz},$$

corresponding to a square root of the power spectrum of $$\sqrt{7.84 \times 10^{-35} \frac{meters}{\sqrt{Hz}}} = 8.8 \times 10^{-18} \frac{meters}{\sqrt{Hz}}.$$

If the separation distance between the two satellites is extended to 100 km, that would lead to a relative square root of the power spectrum of $$\frac{\sqrt{\Delta L(f)}}{L} = 8.8 \times 10^{-23} / \sqrt{Hz}.$$

At this level of sensitivity, this scheme could be used for gravitational wave detection as well. FIG. 9 depicts the square-root power spectrum of the relative displacement between the two satellites, including the contribution of the drag free accelerometer to the total noise.

Logical Flow

FIG. 10 illustrates the logical flow for measuring a relative displacement and rotation in accordance with one or more embodiments of the invention.

At step 1002, a first light is continuously shined from a first light source that is fixed on a first entity to a first 2D plate fixed on a second entity. A first direction of propagation of the first light does not change relative to the first entity.

At step 1004, a second light is continuously shined from a second light source that is fixed on the first entity to a second 2D plate fixed on the second entity. A direction of propagation of the second light does not change relative to the first entity. Further, the first direction of propagation and the second direction of propagation are different.

At step 1008, the displacement of the first light on the first plate and the second light on the second plate is directly monitored to determine a 3D displacement vector that represents a relative displacement (in three dimensions) between the first entity and the second entity.

In embodiments of the invention, the first and second entity may both be satellites. Further third and fourth light sources may be shined from the second entity to the first entity (in a manner similar to that of the first light and the second light) and monitored. Based on the displacement monitoring from all of the lights, a determination can be made regarding which entity caused the relative displacement (i.e., which entity moved relative to the other entity). Such a determination may be made based on a delay associated with a duration taken for the lights to travel from one entity to another entity. In this regard, the displacement monitoring is conducted faster than a time it takes for the light to travel from one entity to another. The rate of collecting data for the displacement vector is determined by a photon counting regime. As long as the photons arriving at a plate that is receiving the light do not reach/exceed the photon counting regime, data can be collected. As used herein, the photon counting regime comprises a time separating two consecutive photons hitting a detector.

In embodiments of the invention, relative displacement as small as $$\frac{W(z)}{\sqrt{SS}}$$

is measured, where W is the width of the first light in a z-direction after being reduced to its optical limit of $$\frac{\lambda}{\pi}$$

and SS=G·N$_{photon}$ is a signal-size being detected at a detection where G comprises a gain of an optical detector and N$_{photon}$ is a number of photons. In a similar manner, the relative displacement in the x and/or y directions can be determined (e.g., the relative displacement is measured in an x-direction and/or a y-direction after being reduced to its optical limit).

In addition to the above, the 3D displacement vectors may be used to quantify a gravity potential of any entity (referred to as a third entity). In this regard, the gravity potential can be utilized to spatially and temporally measure the physical parameters of any entity that is inducing change in the gravity potential. Such third entities may include a planetary body, an object, or a gravitational wave. As an example, such objects may be a macroscopic object and/or a microscopic object such as for example a molecule, a cell, a gravitational wave, or any wave that induces a change in the gravity.

One can also use the same technique described above to determine a relative rotation between one of the entities relative to the other entity. Instead of using a centroid error algorithm to monitor the relative displacement of the center of the beam and therefore deduce the relative displacement of the detecting entity relative to the emitting entity, the change of the width W of the beam at the detection may be monitored to deduce the relative rotation between two entities.

Computer Utilization

The computations/determining/etc. described herein may be conducted using one or more devices within or exterior to the entities (e.g., satellites, planes, etc.) described herein. For example, a computer inside of a satellite that is configured with various processors and processing capabilities may be configured to perform the various operations described herein.

FIG. 11 is an exemplary hardware and software environment 1100 used to perform such computations in accordance with one or more embodiments of the invention. The hardware and software environment includes a computer 1102 and may include peripherals. Computer 1102 may be a user/client computer, server computer, or may be a database computer. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, iPod™, Nook™, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, the some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as COBOL, Pascal, C++, FORTRAN, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transient computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

CONCLUSION

This concludes the description of the preferred embodiment of the invention. Measurements of the relative displacement of satellites via onboard Doppler tracking are of great interest for inferring the interior structure of planetary bodies from the observed gravity fields using the gravity gradiometry technique. The fundamental limitations of missions that use this technique and rely on two satellites, such as NASA's GRACE, GRAIL, and the GRACE Follow-On missions, are constrained by their Doppler technique ranging system limitations, which can't solve the relative displacement between the two satellites better than 4 µm/s [1,2]; and also intrinsically to any Radar or Lidar technologies, their measurements are only made only along the direction of propagation of the field. If z is the direction of propagation of the field along the axis separating the two satellites, and a relative displacement in the (x,y)-plane occurs, then the Doppler technique will not detect it.

Embodiments of the invention overcome this limitation via a new technique referred to as the "Shervin Taghavi Larigani Gravity Gradiometry" (STLGG) technique, which directly measures the relative displacement in the transversal plane of the propagation of the field. Within this context, each satellite shines a laser beam to the other satellite, where differential intensity measurements are performed by multiple onboard photomultipliers. By properly combining these differential intensity measurements, it may be shown that it is possible to reconstruct the three-dimensional relative displacement vector, $(\Delta L_x, \Delta L_y, \Delta L_z)$, a vital observable for reconstructing the components of the gravity field. Embodiments of the invention allow a continuous data acquisition time as opposed the Dual One-Way Doppler tracking technique used by GRAIL and GRACE, which doesn't provide the ability to take data faster than the time it takes light to travel from one satellite to the other satellite, in the order of ms. The sensitivity enhancement of embodiments of the invention, which measures the relative displacement of the two satellites at a resolution of $6.32 \times 10^{-18}$ m/s, twelve orders of magnitude better than the ranging systems used by GRAIL and GRACE, results in improved temporal and spatial resolution of the data and allows a separation distance between the two satellites of only a few meters.

Accordingly, a new remote sensing technique is introduced that is based on measuring the relative displacement of two satellites. This is primarily based on the fact that the density of an object, such as planetary body, induces changes in its respective gravity field.

Embodiments of the invention derive a new technique that measures the relative displacement of a satellite directly. This technique allows for: (1) the measurement of the rate range (or relative displacement) between the two satellites, which does not rely on a USO, as opposed to phase detection (e.g., the Doppler technique); (2) a faster data acquisition rate as the embodiments are not limited by light traveling time between the satellites in order to suppress the USO noises; (3) the measurement of the three-dimensional component of the relative displacement, which allows for more accurate determination of the spatial composition of the relative displacement; (4) a determination of the higher-harmonic components of a body's gravity potential; (5) an improved ground data resolution that could reach 11 orders of magnitude; (6) a more accurate localization of the source of changes in the gravity field by sourcing which of the satellites that may contribute to causing those changes; (7) a detection of high velocity processes and non-radar absorbing materials in a planetary atmosphere; and (8) an increase in the S/N ratio.

In view of the above, embodiments of the invention measure the relative displacement of a satellite directly and are both applicable to measuring the gravity field and gravitational wave. Accordingly, embodiments of the invention allow for resolving high resolution structure(s)/object(s) and processes, relevant for earth and planetary discovery, industrial applications (e.g., increases in the efficiency for air traffic control, better alignment of objects in space, etc.), and for a variety of military applications (e.g., detection of non-radar absorbing materials, high velocity atmospheric objects (missiles, airplanes, etc.,) submarines, underground man-made structure, and missile sites. In this regard, embodiments of the invention are universally-applicable to military and defense and industrial activities, mining, locating subsurface oil reservoirs, locating underground contamination sources, and the retrieval of relevant atmospheric and surface/subsurface parameters.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

If one extends the length of separation between two entities to for example to 100 km, then a relative displacement measurement of $$\frac{\Delta L}{L} \sim 10^{-23} \cdot s^{-1}$$

is reached, which is equivalent to a relative square root of a power spectrum of $$\frac{8.8 \times 10^{-23}}{\sqrt{Hz}}.$$

This can be used for the detection of gravitational wave.

REFERENCES

[1] Antreasian, P. G., et. al., Navigation of the Twin GRAIL Spacecraft into Science Formation at the Moon. 23$^{rd}$ International Symposium on Space Flight Dynamics, Pasadena Convention Center October 29-Nov. 2, 2012,
[2] Byron Taple, Frank Flechtner, Michael M. Watkins, et. al, Gravity Recovery and Climate Experiment: Key GRACE Facts. The Earth Observing System Project Science Office, NASA, http://eospso.gsfc.nasa.gov/eos_homepage/missionprofiles/docs/GRACE.pdf.
[3] http://www.gradiometry.com/gradiometry
[4] Cornwall, J., Despain, A., Eardley, D., Garwin, R., Hammer, D., Jeanloz, R., Katz, J., Rothaus, O., Ruderman, M., Schwitters, R., Treiman, S., & Vesecky, J. Characterization of Underground Facilities. The MITRE Corporation, JASON Program Office, 1-68, 1999.
[5] Sandrine Thomas, Optimized centroid computing in a Shack-Hartmann sensor, Cerro Tololo Inter-American Observatory archive, 2004.
[6] Claire Max. Wavefront Sensing. Lecture 7, Astro 289C, UCSC, Oct. 13, 2011
[7] A. E. Siegman, Lasers, University Science Books, 1986
[8] LISA An international project in the field of Fundamental Physics in Space, Pre-Phase A Report Second Edition July 1998. http://lisa.gsfc.nasa.gov/Documentanon/ppa2.08.pdf
[9] Amon, S., Rotman, S. R., & Kopeika, N. S. Performance limitations of free-space optical communication satellite networks due to vibrations: direct detection digital mode. *Opt. Eng.* Vol 36(11), 3148-3157, 1997.
[10] Kim, J. *In Simulation Study of a Low-Low Satellite-to-Satellite Tracking Mission.* Ph.D. Thesis, University of Texas at Austin, 2000.

What is claimed is:

1. A method for measuring a relative displacement and rotation, comprising:
   continuously shining a first light from a first light source that is fixed on a first entity to a first two-dimensional (2D) plate fixed on a second entity, wherein a first direction of propagation of the first light does not change relative to the first entity, and wherein the first 2D plate comprises a first quad cell;
   continuously shining a second light from a second light source that is fixed on the first entity to a second 2D plate fixed on the second entity, wherein a second direction of propagation of the second light does not change relative to the first entity, and wherein the first direction of propagation is different from the second direction of propagation, and wherein the second 2D plate comprises a second quad cell; and
   monitoring displacement of the first light on the first plate and the second light on the second plate to directly determine a three-dimensional (3D) displacement vector that represents a relative displacement in three dimensions between the first entity and the second entity, wherein the monitoring displacement utilizes a quad cell technique to determine the relative displacement with a resolution of $$\frac{W}{\sqrt{SS}},$$

wherein W represents a width of a light beam of the first light and the second light, and SS represents a signal size of the first light and the second light.

2. The method of claim 1, wherein the first entity and the second entity are both satellites.

3. The method of claim 1, further comprising:
   continuously shining a third light from a third light source that is fixed on the second entity to a third 2D plate fixed on the first entity, wherein a third direction of propagation of the third light does not change relative to the second entity;
   continuously shining a fourth light from a fourth light source that is fixed on the second entity to a fourth 2D plate fixed on the first entity, wherein a fourth direction of propagation of the fourth light does not change relative to the second entity, and wherein the third direction of propagation is different from the fourth direction of propagation;
   monitoring displacement of the third light on the third plate and the fourth light on the fourth plate; and
   determining which entity causes the relative displacement based on the displacement monitoring from the first light, second light, third light, and fourth light.

4. The method of claim 3, wherein:
the determining is based on a delay associated with a duration taken for the third light and the fourth light to travel from the second entity to the first entity; and
the displacement monitoring is conducted faster than a time it takes for the third light and the fourth light to travel from the second entity to the first entity.

5. The method of claim 3, wherein:
a rate of collecting data for the displacement vector is determined by a time separating two consecutive photons hitting a detector; and
as long as a photon arriving at the third plate do not reach the time, data is collected.

6. The method of claim 1, wherein:
relative displacement as small $$\frac{W(z)}{\sqrt{SS}}$$

as is measured, where W is the width of the first light in a z-direction after being reduced to its optical limit of $$\frac{\lambda}{\pi}$$

and $SS = G \cdot N_{photon}$ is a signal-size being detected at a detection where G comprises a gain of an optical detector and $N_{photon}$ is a number of photons.

7. The method of claim 1, further comprising:
utilizing the 3D displacement vector to quantify a gravity potential of a third entity.

8. The method of claim 7, further comprising:
utilizing the gravity potential to spatially and temporally measure physical parameters of the third entity that is inducing change in the gravity potential.

9. The method of claim 1, wherein the 3D displacement vector comprises a relative rotation between the first entity and the second entity.

10. An system for measuring a relative displacement and rotation comprising:
(a) a first light source, wherein:
  (i) the first light source is fixed on a first entity;
  (ii) the first light source continuously shines a first light to a first two-dimensional (2D) plate fixed on a second entity;
  (iii) the first 2D plate comprises a first quad cell; and
  (iv) a first direction of propagation of the first light does not change relative to the first entity;
(b) a second light source, wherein:
  (i) the second light source is fixed on the first entity;
  (ii) the second light source continuously shines a second light to a second 2D plate fixed on the second entity;
  (iii) the second 2D plate comprises a second quad cell;
  (iv) a second direction of propagation of the second light does not change relative to the first entity; and
  (v) the first direction of propagation is different from the second direction of propagation; and
(c) the second entity is configured to directly monitor displacement of the first light on the first plate and the second light on the second plate to determine a three-dimensional (3D) displacement vector that represents a relative displacement in three dimensions between the first entity and the second entity, wherein the second entity directly monitors displacement utilizing a quad cell technique to determine the relative displacement with a resolution of $$\frac{W(z)}{\sqrt{SS}}$$

wherein W represents a width of a light beam of the first light and the second light, and SS represents a signal size of the first light and the second light.

11. The system of claim 10, wherein the first entity and the second entity are both satellites.

12. The system of claim 10, further comprising:
(d) a third light source, wherein:
  (i) the third light source is fixed on the second entity;
  (ii) the third light source continuously shines a third light to a third 2D plate fixed on the first entity; and
  (iii) a third direction of propagation of the third light does not change relative to the second entity;
(e) a fourth light source, wherein:
  (i) the fourth light source is fixed on the second entity;
  (ii) the fourth light source continuously shines a fourth light to a fourth 2D plate fixed on the first entity;
  (iii) a fourth direction of propagation of the fourth light does not change relative to the second entity; and
  (iv) the third direction of propagation is different from the fourth direction of propagation;
(f) the first entity is configured to monitor displacement of the third light on the third plate and the fourth light on the fourth plate; and
wherein: a determination regarding which entity causes the relative displacement is based on the displacement monitoring from the first light, second light, third light, and fourth light.

13. The system of claim 12, wherein:
the determination is based on a delay associated with a duration taken for the third light and the fourth light to travel from the second entity to the first entity; and
the displacement monitoring is conducted faster than a time it takes for the third light and the fourth light to travel from the second entity to the first entity.

14. The system of claim 12, wherein:
a rate of collecting data for the displacement vector is determined by a time separating two consecutive photons hitting a detector; and
as long as a photons arriving at the third plate do not reach the time, data is collected.

15. The system of claim 10, wherein:
relative displacement as small as $$\frac{\lambda}{\pi},$$

is measured, where W is the width of the first light in a z-direction after being reduced to its optical limit of $$\frac{w}{\sqrt{SS}},$$

and $SS = G \cdot N_{photon}$ is a signal-size being detected at a detection where G is the gain of the optical detector and $N_{photon}$ is the number of photons.

16. The system of claim 10, further comprising:
a quantifying entity that is configured to utilize the 3D displacement vector to quantify a gravity potential of a third entity.

17. The system of claim 16, wherein:
the gravity potential is utilized to spatially and temporally measure physical parameters of the third entity that is inducing a change in the gravity potential.

18. The system of claim 10, wherein the 3D displacement vector comprises a relative rotation between the first entity and the second entity.

* * * * *